US012768597B2

(12) United States Patent
Schweikle

(10) Patent No.: US 12,768,597 B2
(45) Date of Patent: Oct. 20, 2026

(54) SLAG DOOR ARRANGEMENT AND CLEANING METHOD

(71) Applicant: Badische Stahl-Engineering GmbH, Kehl (DE)

(72) Inventor: Ralf Schweikle, Gutach im Breisgau (DE)

(73) Assignee: Badische Stahl-Engineering GmbH, Kehl (DE)

( * ) Notice: Subject to any disclaimer, the term of this patent is extended or adjusted under 35 U.S.C. 154(b) by 1014 days.

(21) Appl. No.: 18/051,605

(22) Filed: Nov. 1, 2022

(65) Prior Publication Data

US 2023/0133535 A1 May 4, 2023

(30) Foreign Application Priority Data

Nov. 3, 2021 (EP) .................................... 21206173

(51) Int. Cl.

*F27D 1/18* (2006.01)
*F27D 3/15* (2006.01)
*F27D 25/00* (2010.01)

(52) U.S. Cl.

CPC ......... *F27D 1/1858* (2013.01); *F27D 3/1563* (2013.01); *F27D 25/001* (2013.01); *F27D 2201/00* (2013.01)

(58) Field of Classification Search

CPC ......................................................... F27B 3/19
See application file for complete search history.

(56) References Cited

U.S. PATENT DOCUMENTS 3,973,761 A 8/1976 Pelletier et al.
4,679,773 A 7/1987 Wunsche
4,747,582 A 5/1988 Bergstrom et al.
(Continued)

FOREIGN PATENT DOCUMENTS

AT 403774 B 5/1998
CN 1087428 A 6/1994
(Continued)

OTHER PUBLICATIONS

Office Action from the Chinese Patent Office dispatched Apr. 7, 2022 in related Chinese application No. 202110367068.3, and machine translation thereof.
(Continued)

*Primary Examiner* — Jason Lau
(74) *Attorney, Agent, or Firm* — J-TEK LAW PLLC; Jeffrey D. Tekanic; Scott T. Wakeman

(57) ABSTRACT

A slag door arrangement (10) for a metallurgical furnace (1) includes a furnace vessel (2) with a slag tunnel (8) having a rectangular opening cross section extending laterally through the furnace vessel (2). A pivoting movement of the slag door about a horizontal pivoting axis and a lifting movement of the slag door in a direction perpendicular to the horizontal pivoting axis are independent of each other. A method for cleaning a slag opening of such a metallurgical furnace (1) includes pivoting the slag door to perform a cleaning movement from a position of the slag door in the slag tunnel near the interior of the furnace towards the outside of the furnace out of the slag tunnel at controllably different distances (clearances) from the bottom of the slag opening or of the slag tunnel.

19 Claims, 8 Drawing Sheets

(56) References Cited

U.S. PATENT DOCUMENTS

| | | | |
|---|---|---|---|
| 4,875,663 | A | 10/1989 | Forestier |
| 5,153,894 | A | 10/1992 | Ehle et al. |
| 6,110,415 | A | 8/2000 | Hickman et al. |
| 6,185,242 | B1 | 2/2001 | Arthur et al. |
| 8,124,004 | B2 | 2/2012 | Wunsche |
| 8,206,642 | B2 | 6/2012 | Shver |
| 8,700,197 | B2 | 4/2014 | Plociennik et al. |
| 8,758,674 | B2 | 6/2014 | Miani et al. |
| 9,500,412 | B2 | 11/2016 | Monti |
| 9,759,490 | B2 | 9/2017 | Calvi et al. |
| 2001/0048187 | A1 | 12/2001 | Bortoloni |
| 2011/0295399 | A1 | 12/2011 | Plociennik et al. |
| 2013/0320601 | A1* | 12/2013 | Kephart ................ F27D 3/1536 266/272 |
| 2015/0055673 | A1* | 2/2015 | Reali ..................... F27D 3/1536 373/79 |
| 2016/0153714 | A1 | 6/2016 | Dorndorf et al. |
| 2018/0195141 | A1 | 7/2018 | Al-Harbi |
| 2021/0318069 | A1 | 10/2021 | Volkert et al. |

FOREIGN PATENT DOCUMENTS

| | | | |
|---|---|---|---|
| CN | 2415328 | Y | 1/2001 |
| CN | 105518401 | A | 4/2016 |
| CN | 106498122 | A | 3/2017 |
| CN | 108027205 | A | 5/2018 |
| CN | 108034789 | A | 5/2018 |
| CN | 110923394 | A | 3/2020 |
| DE | 8530922 | U1 | 12/1985 |
| DE | 4034809 | A1 | 5/1992 |
| DE | 102009051145 | A1 | 5/2010 |
| EP | 0385434 | A2 | 9/1990 |
| EP | 0385434 | B1 | 5/1993 |
| EP | 2482019 | A1 | 8/2012 |
| EP | 2482019 | B1 | 10/2014 |
| EP | 2834581 | B1 | 5/2016 |
| ES | 2568519 | A1 | 4/2016 |
| JP | H10219329 | A | 8/1998 |
| KR | 20130134880 | A | 12/2013 |
| WO | 8602437 | A1 | 4/1986 |
| WO | 2007147248 | A1 | 12/2007 |
| WO | 2009153026 | A1 | 12/2009 |
| WO | 2010094584 | A1 | 8/2010 |
| WO | 2011115919 | A1 | 9/2011 |

OTHER PUBLICATIONS

Office Action mailed Apr. 11, 2023, in related U.S. Appl. No. 17/220,574, including examined claims 1-20.

Ralf Schweikle, et al. Integrated EAF safety concept of "BADISCHE-Group"; SMS Siemag AG, Dusseldorf, Germany, 2017.

Machine Translation of Search Report from the Chinese Patent Office dated Mar. 31, 2022 in related Chinese application No. 202110367068.3.

Success in Electric Steelmaking Arccess Eaf Technik, SMS Siemag AG, Dusseldorf, Germany, Mar. 2009.

U.S. Appl. No. 17/675,755, filed Feb. 18, 2022, first named inventor: Danny Schreiber.

Extended European Search Report dispatched Apr. 14, 2022, in related EP application No. 21206173.3.

* cited by examiner

23/H
21
11
40
31
10
8
8r
8b
2b/2s
2a
α
β
σ
E
14
23
x
y
z 1
1e
71
2c
3
4
z
y
x
2b
7
2a 1
61
PRIOR ART
1e x
A
y
z
2e
2
60
2s
P
K
K
P
3
3
z
y
x
7
6
4
5
S
1

SLAG DOOR ARRANGEMENT AND CLEANING METHOD

CROSS-REFERENCE

The present application claims priority to European patent application serial number 21 206 173.3 filed on 3 Nov. 2021, the contents of which are incorporated fully herein by reference.

TECHNICAL FIELD

The present invention generally relates to a slag door arrangement (assembly) for a metallurgical furnace and/or to a method for cleaning the slag opening of a metallurgical furnace.

BACKGROUND ART

Metallurgical furnaces such as electric arc furnaces are known, for example, from EP 0 385 434 A2 (family member U.S. Pat. No. 5,153,894) or U.S. Pat. No. 4,679,773.

Electric arc furnaces (EAF) are available in various designs with regard to the tapping design. Tapping or tap refers, in relation to an action, to the process of draining or pouring liquid steel from the melting vessel during steel-making, and refers, in relation to a device, to the corresponding design of the metallurgical melting vessel.

EAFs can have a tapping or tap in the form of a tapping spout or a tapping hole/tap hole, or a combination thereof, such as a submerged tap hole. There are different types of EAFs with tapping holes, such as EAFs with centric bottom tapping (CBT), with offset bottom tapping (OBT), or with eccentric bottom tapping (EBT). In an EAF with OBT, the furnace lower vessel is circular and the tapping hole is offset from the center. In the case of an EAF with EBT, the furnace lower vessel has a bay in which the taphole is arranged.

The various designs differ, for example, in the way they can be operated. Depending on the design, operation with or without sump (sump=liquid melt remaining in the vessel after a tapping) is possible. There are differences in the tilt angles required for tapping and the resulting design, differences in the required cable lengths for the power supply and therefore in the reactance, differences in the possibility of reducing the running-in of slag, etc.

During a melting process, the metal bath in a metallurgical furnace is covered by a layer of slag. Slag consists of molten, usually non-metallic, substances that are lighter than the molten metal of the metal bath and therefore float on the metal bath. In this application, the term slag also covers solids that are lighter than the molten metal of the metal bath and therefore float on the metal bath, although strictly speaking in metallurgy these solids are called dross. One of the functions of a slag layer is thermal shielding (insulation) of the metal bath.

On the one hand, mixing of the slag and the molten metal must be avoided during tapping. On the other hand, the slag itself is a valuable raw material. The slag is therefore largely removed from the top of the metal bath before tapping. This process is called deslagging. This deslagging is usually performed through a slag opening or slag tunnel in a side wall of the furnace vessel. The slag opening in an EAF is usually on a different side of the furnace vessel than the tapping, usually on the opposite side. For slag removal, the EAF is tilted toward the slag opening. Loss of metal from the metal bath must be avoided as much as possible. Typically, 80% to 95% of the slag in an EAF is removed/deslagged before tapping.

The slag opening or tunnel in the side wall of the furnace vessel is closed by a slag door during most of the melting process. The closure has several effects, including saving energy, preventing loss of metal and/or slag, and protecting operators. Slag door arrangements for closing the slag tunnel of a metallurgical furnace are known in the prior art.

A slag door arrangement with three door parts is known from WO 2007/147248 A1 (family members U.S. Pat. No. 8,124,004 and EP 2 044 377 B1). A first upper part of the slag door assembly is pivotable about a horizontal axis, located outside the furnace vessel and above the slag tunnel, between a closed position in the slag tunnel and an open position outside and above the slag tunnel. A second and a third lower portion of the slag door assembly are pivotable about respective vertical axes, located outside the furnace vessel and laterally to the right and left of the slag tunnel, respectively, between a closed position in the slag tunnel and an open position outside and laterally to the right and left of the slag tunnel, respectively. During the pivoting movement of the second and third parts of the slag door assembly from their opening position to their closing position, they are moved from outside the slag tunnel to inside the slag tunnel along the bottom of the slag tunnel and of the slag opening. Any objects on the bottom of the slag tunnel, such as slag residues, are thereby pushed into the slag tunnel. Cleaning the bottom of the slag tunnel to remove slag residues is effected by means of a pivoting movement from outside the furnace into the slag tunnel.

A slag door arrangement with two door parts is known from WO 2010/094584 A1 (family members U.S. Pat. No. 8,758,674 and EP 2 489 971 B1). A first upper part and a second lower part of the slag door arrangement are linearly displaceable outside the furnace vessel between a closed position and an open position outside and above the slag opening. The second lower portion of the slag door assembly is linearly movable along the bottom of the slag opening and of the slag tunnel into the furnace when in the closed position. Objects located on the bottom of the slag opening and of the slag tunnel, such as slag residues, are thereby pushed through the slag tunnel into the furnace. Cleaning the bottom of the slag tunnel to remove slag residues is effected by means of a linear movement from outside the furnace through the slag tunnel into the furnace.

A slag door arrangement is known from WO 2011/115919 A1 (family members U.S. Pat. No. 8,206,642 and EP 2 547 797 B1), in which a slag door unit can be pivoted about a horizontal axis, which is located outside the furnace vessel and above the slag tunnel, between a closed position in the slag tunnel and an open position outside and above the slag tunnel. Objects such as slag residues located on the bottom of the slag opening and the slag tunnel are thereby pushed into the slag tunnel and possibly into the furnace. Cleaning the bottom of the slag tunnel to remove slag residues is effected by means of a pivoting movement from outside the furnace into the slag tunnel.

EP 2 834 581 A1 (family member US 2015/0055673 A1) discloses a slag door assembly comprising a slag door, the width of which is wider than the width of a rectangular opening cross-section of the slag tunnel to close the same on the outside of the furnace vessel, a slag door pivoting device which can pivot the slag door about a horizontal pivot axis, and a slag door lifter adapted to move the slag door between a lower minimum lifting position and an upper maximum position, wherein the slag door lifter is mounted at (on) the furnace vessel and the slag door pivoting device is mounted at (on) the slag door lifter. ES 2 568 519 A1 and US 2001/0048187 A1 also disclose slag door assemblies.

SUMMARY OF THE INVENTION

It is one non-limiting object of the present techniques to disclose techniques for improving a slag door arrangement (assembly) for a metallurgical furnace and for improving a method for cleaning the slag opening of a metallurgical furnace.

In one non-limiting aspect of the present teachings, a slag door assembly (arrangement) for a metallurgical furnace has a furnace vessel with a slag tunnel having a rectangular opening cross-section provided laterally in (extended laterally through) the furnace vessel, the slag door assembly comprising a slag door, the width of which corresponds to the width of the rectangular opening cross-section of the slag tunnel with a clearance which allows movement of the slag door in the slag tunnel, a slag door pivoting device which can be pivoted about a horizontal pivot axis, and a slag door lifter on which the slag door is mounted and which is configured (adapted) to move the slag door between a (first) lower minimum lifting position and a (second) upper maximum lifting position perpendicular to the horizontal pivot axis, wherein the slag door pivoting device is pivotable for pivoting about the horizontal pivot axis through a range of pivot angles between a first pivot angle that spans from a vertical plane through (including) the horizontal pivot axis toward the furnace vessel and a second pivot angle which is in the vertical plane or spans from the vertical plane through the horizontal pivot axis in a direction away from the furnace vessel, and the slag door lifter is mounted on the slag door pivoting device in a manner that a pivoting movement of the slag door about the horizontal pivot axis and a lifting movement of the slag door in the direction perpendicular to the horizontal pivot axis are independent of each other.

The slag door assembly provides reliable sealing of the slag opening or slag tunnel of a metallurgical furnace during the melting process combined with improved cleaning of the slag opening or slag tunnel by performing a cleaning movement of the slag door from a position in the slag tunnel near (closest to) the interior of the furnace toward a position outside of the furnace and out of the slag tunnel.

The same is true for a metallurgical furnace equipped with the slag door assembly.

Another non-limiting aspect of the present teachings concerns a method for cleaning a slag opening of a metallurgical furnace, in particular an electric arc furnace, comprising a furnace vessel having a side wall, a slag tunnel provided laterally in (extended laterally through) the side wall of the furnace vessel with a rectangular opening cross-section and side walls, an upper outer edge and a bottom, a slag door assembly comprising a slag door, the width of which corresponds to the width of the rectangular opening cross-section of the slag tunnel with a clearance which allows movement of the slag door in the slag tunnel, a slag door pivoting device which can be pivoted about a horizontal pivot axis, and a slag door lifter on which the slag door is mounted and which is adapted to move the slag door between a (first) lower minimum lifting position and a (second) upper maximum lifting position perpendicular to the horizontal pivot axis.

In the method, the slag door pivoting device is pivotable for pivoting about the horizontal pivot axis through a range of pivot angles between a first pivot angle that spans from a vertical plane through the horizontal pivot axis toward the furnace vessel and a second pivot angle which is in the vertical plane or spans from the vertical plane through the horizontal pivot axis in a direction away from the furnace vessel, and the slag door lifter is mounted on the slag door pivoting device in a manner that a pivoting movement of the slag door about the horizontal pivot axis and a lifting movement of the slag door in the direction perpendicular to the horizontal pivot axis are independent of each other, and the horizontal pivot axis lies outside the furnace vessel. The method comprises:

a) moving the slag door pivoting device, after a deslagging operation in which the slag door is moved using the slag door lifter to or close to the (second) upper maximum lifting position, to a position pivoted about the horizontal pivot axis by a third pivot angle corresponding (equal) to the first pivot angle minus 0 to 5°;

b) moving the slag door using the slag door lifter in the direction of the (first) lower minimum lifting position to a predetermined distance (clearance) from the bottom of the slag tunnel so that the slag door projects obliquely into the slag tunnel from the outside at the top and faces its side walls with a clearance;

c) moving the slag door lifter about the horizontal pivot axis in the direction of the second pivot angle to a fourth pivot angle corresponding (equal) to the second pivot angle minus 0 to 5°, either while simultaneously moving the slag door using the slag door lifter to maintain at least the predetermined distance (clearance) from the bottom of the slag tunnel so that the slag door is moved parallel to and along the bottom at least at the predetermined distance (clearance), or in a movement on a circular section (arc) with a minimum distance (clearance) at the greatest (closest) approach to the bottom of the slag tunnel;

d) moving the slag door pivoting device about the horizontal pivot axis in the direction of the first pivot angle to a position pivoted by a third pivot angle corresponding (equal) to the first pivot angle minus 0 to 5° with the slag door moved toward the (second) upper maximum lift position such that the slag door is thereby moved a distance (clearance) from the floor greater than the predetermined distance (clearance) or the minimum distance (clearance); and e) moving the slag door using the slag door lifter in the direction of the (first) lower minimum lifting position until the slag door contacts (e.g., scraps) the bottom of the slag tunnel, so that the slag door projects obliquely into the slag tunnel from the outside at the top and faces its side walls with a clearance.

The above-described method enables improved cleaning of the slag opening or slag tunnel of a metallurgical furnace by performing a cleaning movement of the slag door from a position in the slag tunnel (in which the bottom of the slag door is) near (closest to) the interior of the furnace toward a position (in which the bottom of the slag door is) outside of the furnace and out of the slag tunnel. Depending on the amount of contamination remaining in the slag opening or the slag tunnel of the metallurgical furnace, this cleaning movement can be performed several times at different distances (clearances) from the bottom of the slag opening or slag tunnel. For example, in one or more of the subsequent cleaning movements, the distance (clearance) between the bottom of the slag door (or another lowermost structure of the slag door, such as a slag pusher) and the bottom (floor) of the slag opening can be decreased as compared to a preceding cleaning movement, e.g., to a smaller positive clearance or even to zero.

The pivotal movement of the slag door about a horizontal pivot axis and the linear movement of the slag door in a direction perpendicular to the horizontal pivot axis, which are independent of each other, allow (enable) control of the cleaning movement of the slag door from a position (in which the bottom of the slag door is) in the slag tunnel near (closest to) the interior of the furnace toward a position (in which the bottom of the slag door is) outside of the furnace and out of the slag tunnel at controllably different distances (clearances) from the bottom of the slag opening or tunnel.

BRIEF DESCRIPTION OF THE DRAWINGS

Further features and usefulness will be apparent from the description of examples of embodiments based on the figures.

FIGS. 3A-3C show partial views of the EAF in a horizontal position with the first embodiment of the slag door arrangement from FIG. 2, in which FIG. 3A shows a top view thereof, FIG. 3B shows a sectional view thereof along line A-A shown in FIG. 3A, and FIG. 3C shows a side view thereof along line B-B shown in FIG. 3A;

FIGS. 4A-4C shows partial views of the EAF with the first embodiment of the slag door arrangement of FIG. 2 in sectional views along line A-A of FIG. 3A, in which FIG. 4A shows the slag door closed in a downwardly moved and inwardly pivoted position, FIG. 4B shows the slag door in a downwardly moved and outwardly pivoted position, and FIG. 4C shows the slag door in an upwardly moved and outwardly pivoted position;

FIGS. 5A-5D show partial views of the EAF in a tilted position for slagging with the first embodiment of the slag door arrangement, in which FIG. 5A shows a top view thereof, FIG. 5B shows a side view thereof along the line C-C shown in FIG. 5A, FIG. 5C shows a view of the slag door side along the line D-D shown in FIG. 5B, and FIG. 5D shows a schematic representation of a control device;

FIGS. 6A-6B show a second embodiment of a slag door arrangement in a side perspective view from the front left outside an EAF, in which FIG. 6A shows a closed slag door and FIG. 6B shows an open slag door;

FIGS. 7A-7F show partial views of an EAF with a third embodiment of a slag door arrangement in six sectional views along a line corresponding to line A-A of FIG. 3A, wherein FIGS. 7A to 7F show different positions in a motion sequence of the slag door for cleaning the slag opening; and FIGS. 8A-8C show views of a conventional EAF, in which FIG. 8A shows components of the EAF in an exploded view, FIG. 8B shows the EAF of FIG. 8A in a side view from the slag door side with the lid and electrodes raised, and FIG. 8C shows the EAF of FIG. 8A in a top view.

DETAILED DESCRIPTION OF THE EMBODIMENTS OF THE INVENTION

Figures 8A, 8B, 8C:
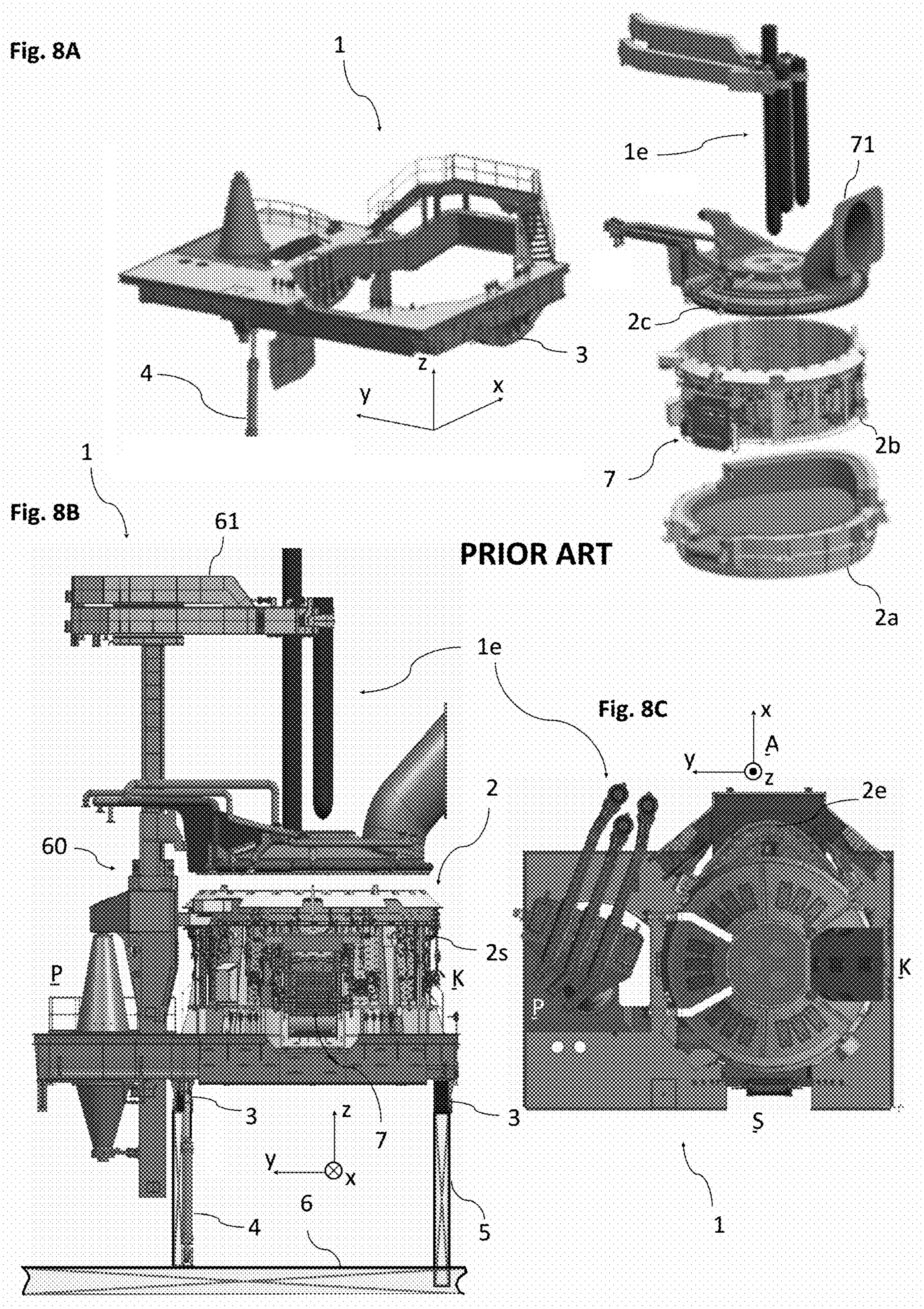

FIG. 8A shows components of a typical conventional (known) electric arc furnace (EAF) in an exploded view, FIG. 8B shows the EAF of FIG. 8A in a side view from the slag door side, and FIG. 8C shows the EAF of FIG. 8A in a top view.

The EAF 1 of FIGS. 8A-8C has a furnace vessel 2 with a furnace lower vessel 2*a,* a furnace upper vessel 2*b* and a furnace lid 2*c*. The furnace vessel 2 is supported via a furnace tilting device having a furnace cradle 3 and a hydraulic cylinder 4 in a tiltable manner on a foundation 5 (shown only schematically) and thus on the floor 6. In the EAF 1 of FIGS. 8A-8C, a slag door 7 is arranged on one side in the side wall 2*s* of the furnace vessel 2. This side is hereinafter referred to as the slag door side S. The EAF 1 has an eccentric bottom tapping (EBT) in a bay 2*e* of the furnace lower vessel 2*a* on a side opposite to the slag door side S, which is hereinafter referred to as tapping side A and which is shown on the upper side of FIG. 8C.

The furnace lower vessel 2*a* has an outer shell lined with refractory material (lining). The EBT has a taphole, not shown, which extends through the furnace lower vessel 2*a,* i.e. through the outer shell and the lining. The taphole is closed during meltdown and prior to tapping by a slide (not shown) on the underside of the furnace lower vessel 2*a* and is filled with a refractory filler material.

FIG. 8C shows a coordinate system x-y-z. The direction x points in the horizontal direction from the slag door side S toward the tapping side A of the EAF. The direction y points in the horizontal direction, seen from the slag door side S, from right to left, in this case from the side K where an exhaust manifold 71 is attached to the furnace lid 2*c* toward the side where a gantry 60 is located. The direction z is directed perpendicular to directions x and y out of the paper plane, and thus perpendicular to the ground (floor 6) from bottom to top.

In a plan view, the bay 2*e* of the EAF 1 protrudes in the x-direction beyond (over) the circumference of the furnace upper vessel 2*b*.

The EAF 1 shown is an AC-powered EAF and has three electrodes 1*e* that extend through the furnace lid 2*c* into the furnace vessel during operation. The electrodes 1*e* are attached to electrode support arms 61, which are connected to the gantry (lifting and pivoting device) 60. In FIG. 8B, the EAF from FIG. 8A is shown in a side view from the slag door side S in a horizontal position in which the lid 2*c* is lifted by means of the gantry 60. Furnace vessel 2 is shown in FIGS. 8B and 8C in a horizontal (not tilted) position. In the position shown in FIG. 8B, the electrodes 1*e* are pulled out of lid 2*c*. For tapping and for slag removal, furnace vessel 2 is tilted by means of furnace tilting device 3, 4 about a tilting axis parallel to the y-axis.

A slag door arrangement 10 according to the present teachings can be retrofitted in conventional metallurgical furnaces or can be provided in new metallurgical furnaces. For example, a slag door arrangement 10 according to the present teachings can be installed in such a conventional EAF 1 of FIGS. 8A-8C in place of the slag door 7. The slag door arrangement 10 can be retrofitted in conventional EAFs or provided in new EAFs.

Figure 1:
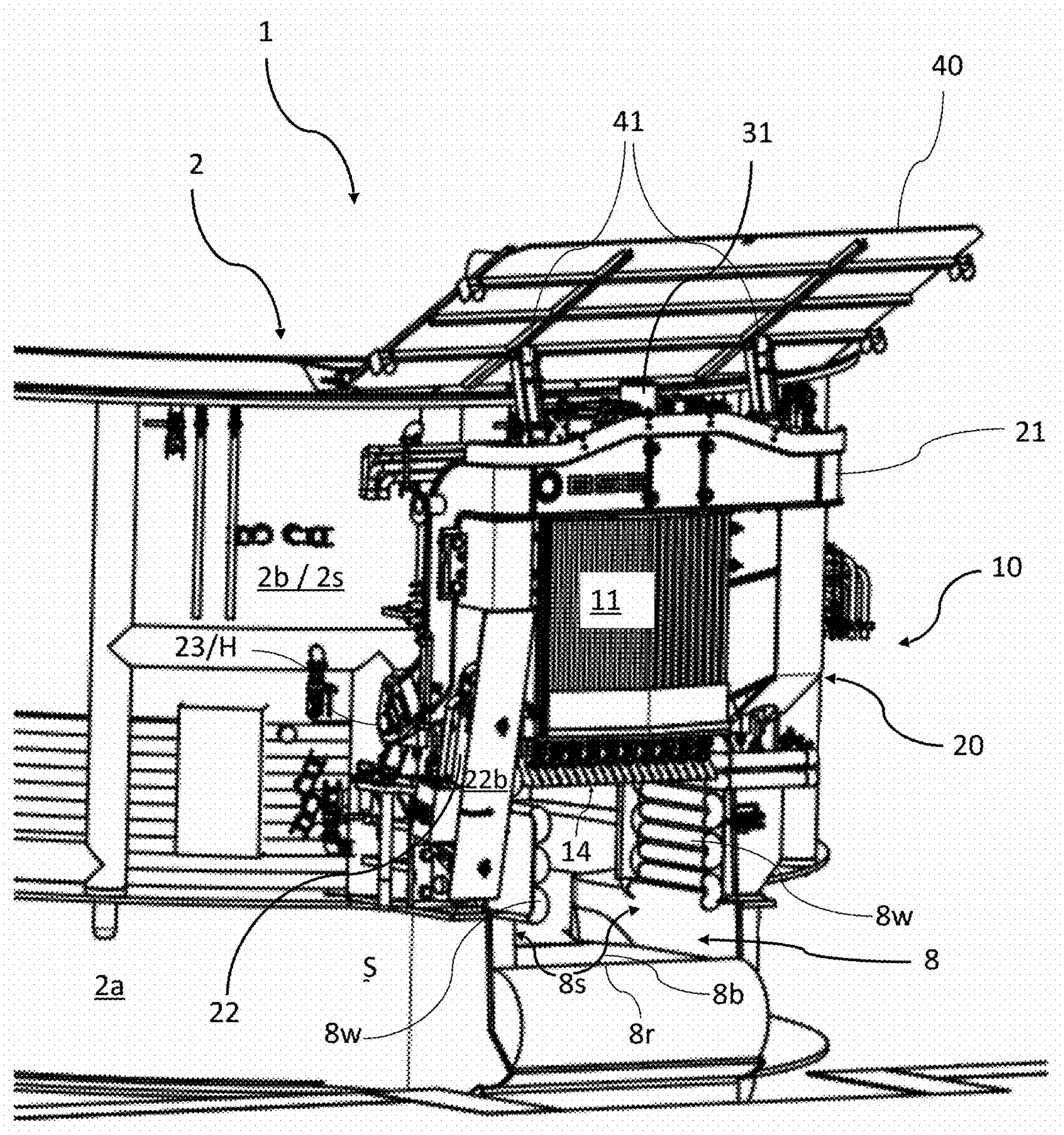
FIG. 1 shows a partial view of an EAF with a first embodiment of a slag door arrangement in a side perspective view from the front left outside the EAF with an open slag door.
Figure 2:
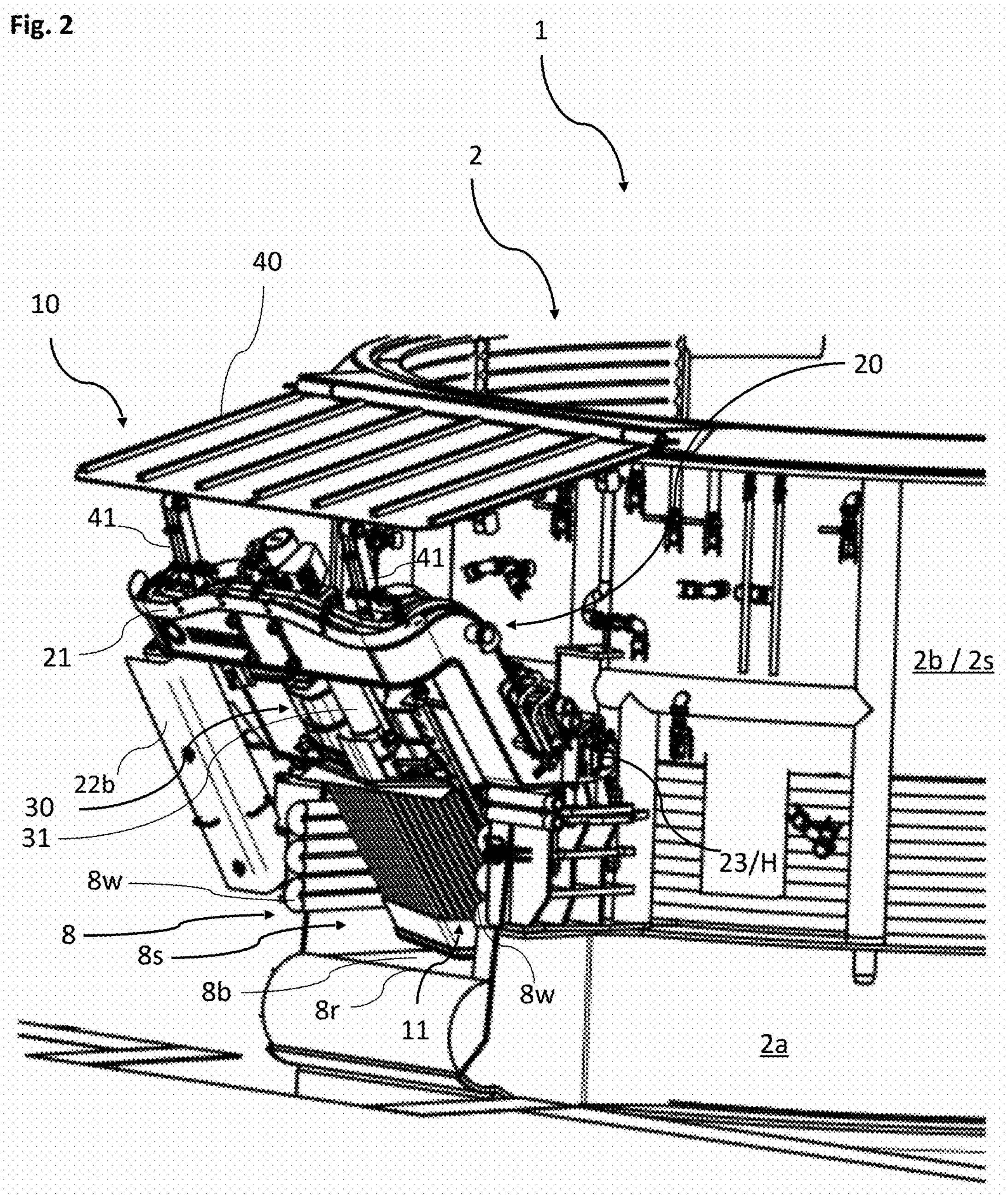
FIG. 2 shows a partial view of the EAF with the first embodiment of the slag door arrangement from FIG. 1 in a lateral perspective view from the right front outside the EAF with a closed slag door.

A first embodiment of a slag door arrangement 10 according to the present teachings is described with reference to FIGS. 1 to 5D. FIG. 1 shows a partial view of an EAF with a first embodiment of a slag door arrangement 10 in a side perspective view from the left front outside the EAF with the slag door open, and FIG. 2 shows a partial view of the EAF with the first embodiment of a slag door arrangement of FIG. 1 in a side perspective view from the right front outside the EAF with the slag door closed. FIGS. 3A to 5D show partial views of an EAF with the first embodiment of the slag door arrangement 10 in the different top views, sectional views and side views described above.

The EAF 1 of FIGS. 1 to 5D has the structure shown in FIGS. 8A-8C and described above. The coordinate system x-y-z of FIGS. 8A-8C and the corresponding directions also apply to FIGS. 1 to 7F and the description of the invention. In FIGS. 1 to 5D, a furnace vessel 2 with a furnace lower vessel 2*a* and a furnace upper vessel 2*b* are shown. The furnace lid 2*c,* the electrodes 1*e,* the gantry 60, the furnace tilting device with the furnace cradle 3 and the hydraulic cylinder 4, the foundation 5, the floor 6, the EBT, etc. of FIGS. 8A-8C are not shown in the partial views in FIGS. 1 to 5D. In the EAF 1 of FIGS. 1 to 5D, instead of the slag door 7 of FIGS. 8A-8C, the first embodiment of the slag door arrangement 10 is arranged on one side in the side wall 2*s* of the furnace vessel 2. This side is in turn referred to below as the slag door side S.

Figure 4A:
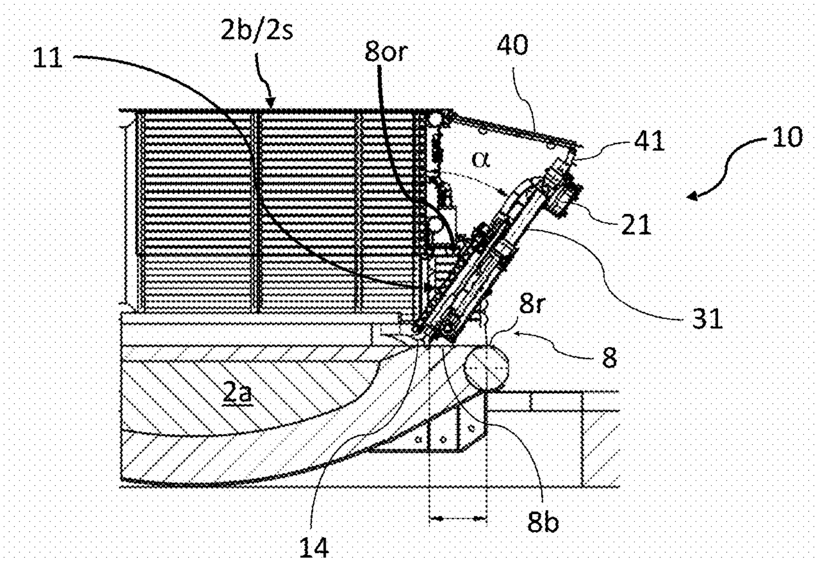
Figure 4B:
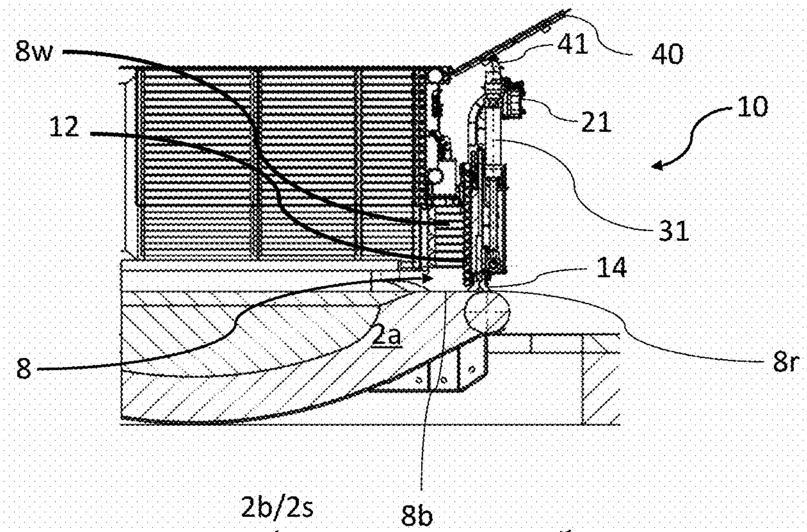
Figure 4C:
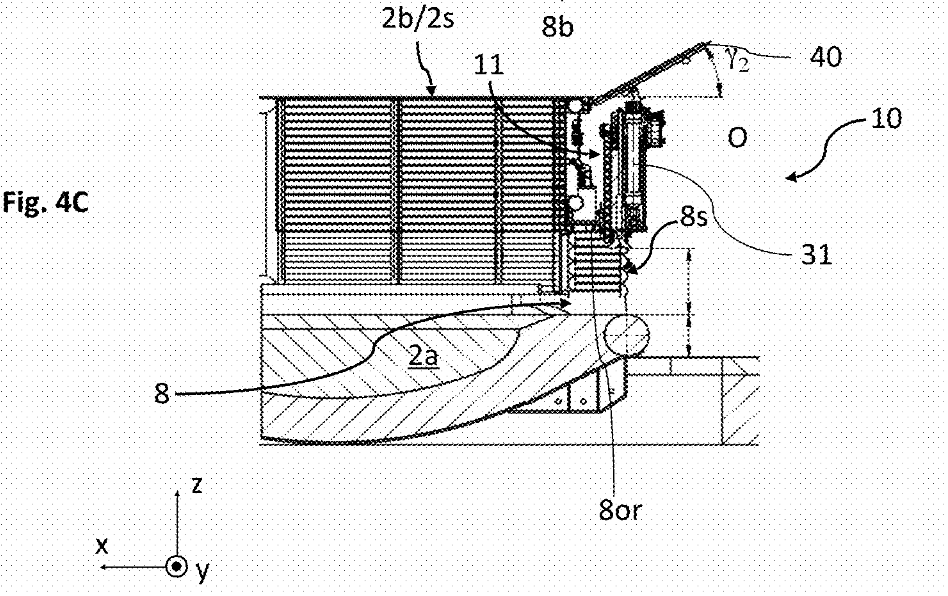
Figure 5A:
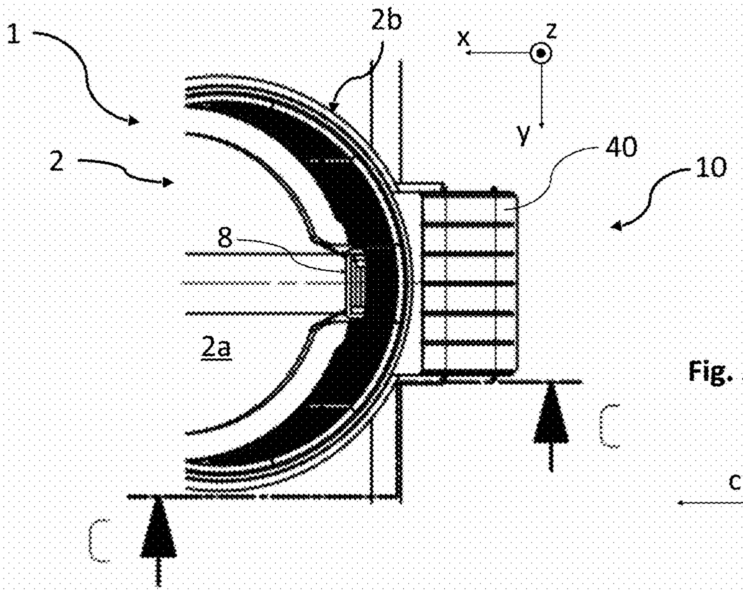

The furnace vessel 2 is shown in FIGS. 1 to 4C in a horizontal (non-tilted) position, which is also referred to herein as the "horizontal tilt position". For tapping and for slag removal, the furnace vessel 2 can be tilted by means of the furnace tilting device 3, 4 about a tilting axis parallel to the y-axis. FIG. 5B shows a position tilted by the angle κ for slag removal.

The furnace vessel 2 comprises a slag tunnel 8 having a rectangular opening cross-section provided (extending) laterally in (through) the furnace vessel 2. The slag tunnel 8 comprises side walls 8*s,* an upper outer edge 8*or* and a bottom 8*b*. The upper outer edge 8*or* extends horizontally in the horizontal position of the furnace vessel and limits (defines) a top side of the rectangular opening cross-section. The side walls 8*s* each extend at a right angle to the upper outer edge (top outer rim) 8*or* and to the bottom 8*b*.

Figure 5D:
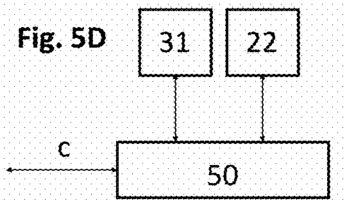
Figure 5B:
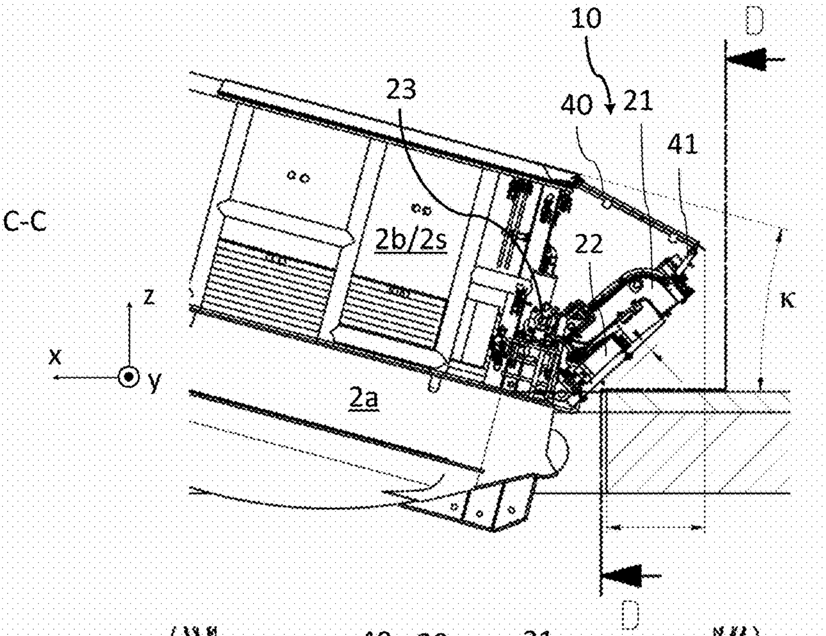
Figure 5C:
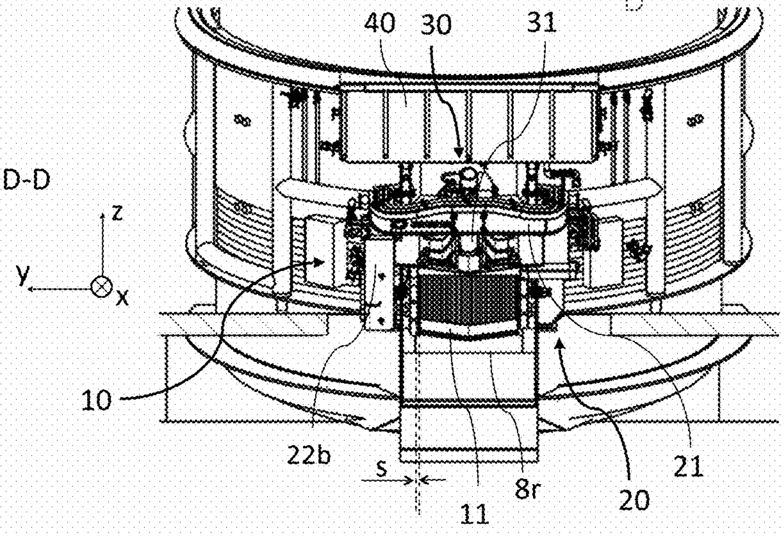

The slag door arrangement 10 includes: a plate-shaped slag door 11, the width of which corresponds to the width of the rectangular opening cross-section of the slag tunnel 8 with a clearance s that permits movement of the slag door 11 within the slag tunnel 8 and is shown schematically in FIG. 5C; a slag door pivoting device 20 that is pivotable about a horizontal pivot axis H; and a slag door lifter 30 on which the slag door 11 is mounted and which is adapted (configured) to move the slag door 11 between a (first) lower minimum lifting position U and a (second) upper maximum lifting position O perpendicular to the horizontal pivot axis H.

The slag door pivoting device 20 has a rocker arm 21, which is mounted laterally on both sides of the slag tunnel 8 on the furnace vessel 2 in such a way that it can be pivoted about the horizontal pivot axis H, and a hydraulic cylinder (linear actuator) 22, which is connected to the rocker arm 21 at one end and is mounted on the furnace vessel 2 at its other end. In the embodiments shown, the hydraulic cylinder 22 is arranged on the left side of the rocker arm 21 as viewed from the slag door side S. In FIG. 1 it is largely concealed by a protective plate 22*b,* but in FIGS. 3C and 5B and in the second embodiment in FIGS. 6A and 6B the cylinder 22 is clearly visible. In the embodiment, the rocker 21 is formed as a kind of yoke which is pivotally mounted on the left and right sides of the furnace vessel 2 via coaxial horizontal axes 23. As a result, the rocker 21 can be moved to various pivot positions relative to the axes 23 by changing the length of the hydraulic cylinder 22.

The slag door lifter 30 is mounted (attached) to (on) the slag door pivoting device 20. The slag door lifter 30 includes: a hydraulic cylinder 31, which is connected at one end to the slag door 11 and at its other end to the slag door pivoting device 20; and a linear guide 32, in which the slag door 11 is displaceably mounted and which is mounted on the slag door pivoting device 20.

The described arrangement allows (enables) a pivoting movement of the swing arm 21 to be independent of a linear movement of the slag door 11 in the linear guide 32.

Figures 7A, 7B, 7C, 7D, 7E, 7F:
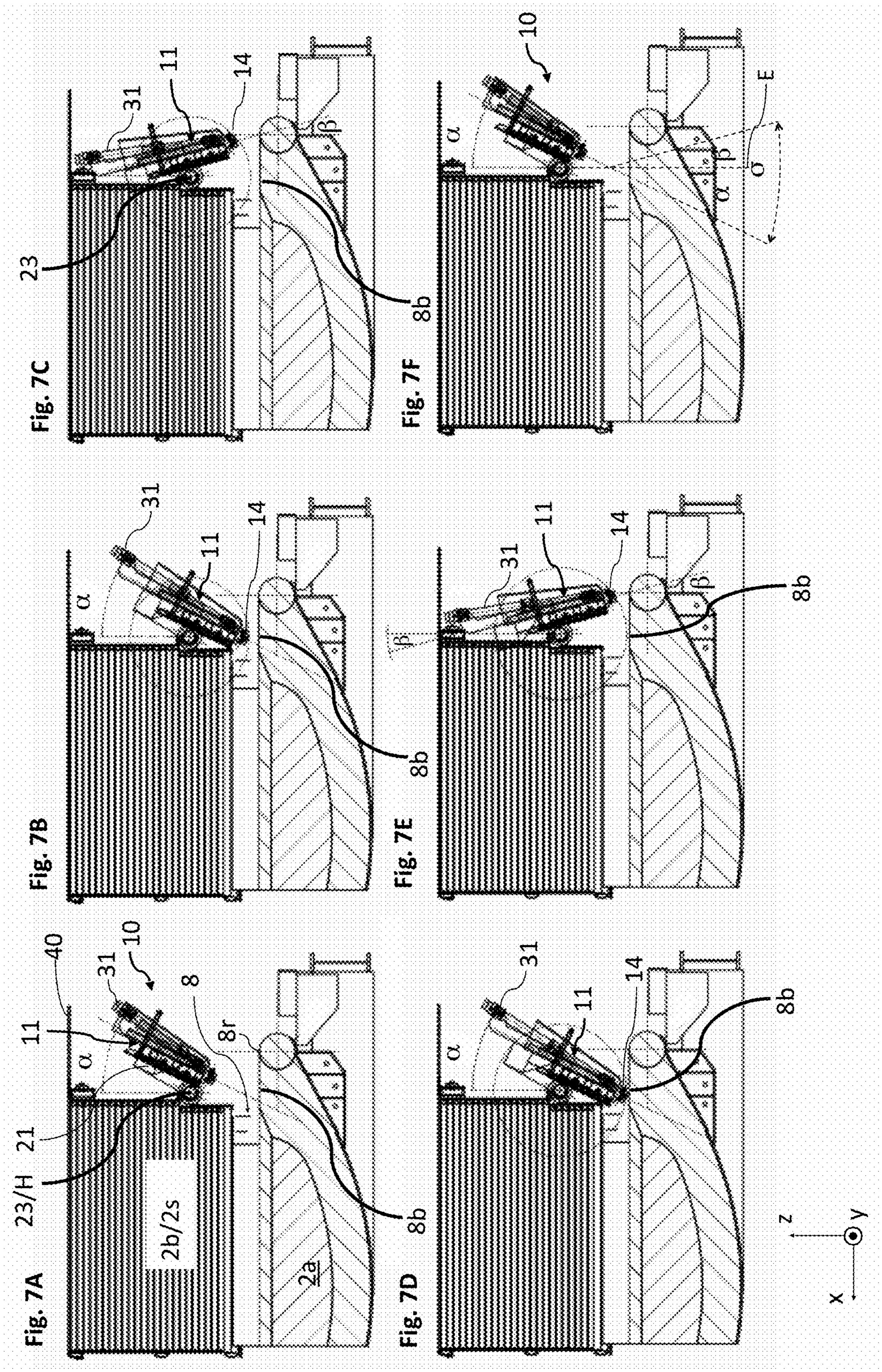

The slag door pivoting device 20 is pivotable to pivot the rocker 21 and thus the slag door 11 mounted thereon about the horizontal pivot axis H, which in this embodiment is defined by the coaxial horizontal axes (shafts) 23. The slag door pivoting device 20 and the slag door 11 are pivotable in a pivot angle range σ between a first pivot angle α, in which one side or ray is (extends in) a vertical plane E (see FIG. 7F) through (including) the horizontal pivot axis H (the vertical plane E is vertical in the horizontal (not tilted) position of the furnace vessel), and which first pivot angle α spans in the direction of the furnace vessel 2 (e.g., such that the second side or ray of the first pivot angle α, which is parallel to a plane defined by the plate-shaped slag door 11, extends from a vertex (i.e. the horizontal pivot axis H) in the vertical plane E that is on a (the) crossing line of the vertical plane E and a plane that is parallel to the horizontal axis H and parallel to the movement path of the slag door 11 in a most inwardly inclined pivot position of the slag door 11 (the position in which the upper end of the slag door 11 has the largest distance from the side wall 2*s* of the furnace top vessel 2*b*) between the (first) lower minimum lifting position U and a (second) upper maximum lifting position O (in FIG. 7F shown below the horizontal pivot axis H) such that the second side or ray of the first pivot angle α extends downwardly from the vertex in a direction towards the furnace vessel 2), and a second pivot angle β, which in the present embodiment is in the vertical plane E and is therefore equal to 0°, i.e. in the present embodiment both sides or rays of the second pivot angle β extend in the vertical plane E. In the first embodiment, the magnitude of the pivot angle range σ is therefore equal to that of the first pivot angle α. In other words, as can be seen in FIGS. 3B and 4A, at the first pivot angle α, the lower portion of the slag door 11 (in particular, the slag pusher 14) is closer to the furnace vessel 2 than the upper portion of the slag door 11. Furthermore, as can be seen in FIG. 4B, at the second pivot angle α, the slag door 11 is parallel to the up-down direction (direction z).

The slag door arrangement 10 is attached to the furnace vessel 2 in such a manner that, in a horizontal tilt position of the furnace vessel 2, the plane E through the horizontal pivot axis H is perpendicular to the horizontal. The design of the slag door arrangement 10 causes the slag door 11, in a position of the slag door pivoting device 20 pivoted about the horizontal pivot axis H by a third pivot angle α' corresponding (equal) to the first pivot angle α minus 0 to 5°, and in a position of the slag door lifter 30, in which the slag door 11 is moved in the direction of the (first) lower minimum lifting position U until it contacts the bottom 8*b* of the slag tunnel 8, projects obliquely into the slag tunnel 8 from the outside at the top and faces its side walls 8*s* with clearance s. This position is shown in FIG. 2 (and in FIG. 4A).

In the slag door arrangement 10, the slag tunnel 8 is fully open to the outside of the furnace vessel 2 when the slag door 11 is moved to a position that results when the slag door pivoting device 20 has been pivoted about the horizontal pivot axis H by a fourth pivot angle β' corresponding (equal) to the second pivot angle β minus 0 to 5° and when the slag door lifter 30 had moved the slag door 11 to the (second) upper maximum lifting position O. This position is shown in FIG. 1 (and in FIG. 4C).

In the slag door arrangement 10, the lower edge of the slag door 11 contacts the floor **8*b* of the slag tunnel 8 when the slag door 11 is moved into a position defined by a pivoted position of the slag door pivoting device 20 about the horizontal pivot axis H by the fourth pivot angle β', which corresponds to the second pivot angle β minus 0 to 5°, and into a position of the slag door lifter 30 in which the slag door 11 is moved in the direction of the (first) lower minimum lifting position U until it contacts the bottom 8*b* of the slag tunnel 8. This position is shown in FIG. 4**B.

A slag pusher 14 is attached to the slag door 11 on its underside facing away from the horizontal pivot axis H. The slag pusher 14, which can be clearly seen in FIGS. 1, 3B and 4A, comes into contact with the bottom **8*b* of the slag tunnel when the slag door 11** is in a corresponding position.

A protective cover 40 is provided in a vertical direction above the slag door 11, the slag door pivoting device 20 and the slag door lifter 30. The outer dimensions of the protective cover 40 cover the slag door 11, the slag door pivoting device 20 and the slag door lifter 30 in each pivot and lifting position thereof in a vertical plan view. This can be seen clearly in FIG. 3A. One of the purposes of the protective cover 40 is to protect the slag door assembly 10 from parts, scrap, debris, etc. falling from above. An EAF is loaded, for example, by charging (dropping) material to be melted, such as scrap, from above through the upper opening of the furnace vessel 2. During this process, the furnace lid **2*c* is swung away to the side. The scrap is moved over the furnace vessel 2 by means of a scrap basket. In this process, e.g., some of the scrap may fall down outside of the furnace vessel 2, which could damage the slag door arrangement 10**.

In the first embodiment, the plate-shaped protective cover 40 is pivotally mounted at a lateral edge about a horizontal axis to the upper edge of the furnace vessel or close to the edge. The plate-shaped protective cover 40 is also hinged to the rocker 21 via connecting bars 41. In the first embodiment, parts of the slag door arrangement 10 such as the upper end of the hydraulic cylinder 31 protrude in the height direction z up to the height of the upper furnace vessel **2*b* or beyond when the slag door pivoting device 20 is in the position pivoted by the fourth pivot angle β' corresponding (equal) to the second pivot angle β minus 0 to 5° (see FIGS. 1, 4B, 4C). Then, the protective cover 40 must also protrude beyond the height of the furnace upper vessel 2*b* in this position. If the protective cover 40 were to be (hypothetically) fixed and thus could not pivot, this position would hinder charging using the scrap basket, even though during charging the slag tunnel is closed and the parts of the slag door arrangement 10 such as the upper end of the hydraulic cylinder 31 would not protrude at all in the height direction z (see FIGS. 2, 3, 4A). That is why the protective cover 40 is pivoted relative to the horizontal via the connecting bars 41 between the fifth and sixth pivot angles $\gamma_1$ and $\gamma_2$ (see FIGS. 3C and 4C). This arrangement is particularly suitable for furnaces, in which the height of the side walls of the furnace vessel 2** is relatively low.

In a plan view, the bottom **8*b* of the slag tunnel 8 is extended laterally beyond side wall 2*s* of the furnace vessel 2 to a bottom edge 8*r*. This edge 8*r* is located at the top of an end piece of the bottom of the slag tunnel 8**, which has a round cross-section perpendicular to the y-direction so that the slag can run off over its round surface during deslagging.

In the slag door arrangement 10 of the first embodiment, the length of the bottom **8*b* in the x-direction and thus the position of the edge 8*r* of the bottom 8*b* of the slag tunnel 8 is selected such that the lower edge of the slag door 11 contacts the bottom 8*b* of the slag tunnel 8 with the slag pusher 14 at the bottom edge 8*r* when the slag door 11 is moved to a position which is produced by a position of the slag door pivoting device 20 being pivoted about the horizontal pivot axis H by the fourth pivot angle β' corresponding to the second pivot angle β minus 0 to 5°, and to a position of the slag door lifter 30 in which the slag door 11 is moved in the direction of the (first) lower minimum lifting position U until it contacts the bottom 8*b* of the slag tunnel 8. This position is shown in FIG. 4**B.

In the slag door arrangement 10 of the first embodiment, water-cooled plate-shaped panels 12 are provided on each of the side walls **8*s* of the slag tunnel 8. These panels 12 are each not provided starting directly from the bottom 8*b*, but starting from a certain height away (spaced apart) from the bottom 8*b*. From the bottom 8*b* up to this height, the side walls 8*s* are formed by parts of the furnace vessel 2** which are formed either of refractory material such as the lining or of slabs. Water-cooled plate-shaped panels would be too susceptible to mechanical damage from any scrap or fragments of the lining or the like which may have been carried along with the deslagged slag.

In FIG. 5D, a control device 50 is shown schematically, which is connected to the slag door pivoting device 20 or its hydraulic cylinder 22, and to the slag door lifter 30 or its hydraulic cylinder 31. The control device 50 is configured (adapted) for inputting and storing parameters for controlling the pivot positions and lifting positions thereof. The double-ended arrow c is intended to indicate that the controller 50 can also receive data, measured values, position values, etc. from the slag door pivoting device 20 or its hydraulic cylinder 22 and the slag door lifter 30 or its hydraulic cylinder 31, etc. The double arrow c also is intended to indicate that the control device 50 can be connected to further elements of the EAF 1 such as sensors, a higher-level control system, etc.

A water-cooled, preferably plate-shaped panel 12 is attached to the slag door 11 on the side facing an interior space of the furnace vessel 2, as can be seen clearly in FIG. 3B and in FIG. 4B.

The control device 50 is configured (adapted) to control the pivot positions of the slag door pivoting device 20 and the lift positions of the slag door lift 30, and thus to control movements of the slag door arrangement 10 such that the slag door 11 performs a cleaning movement from a position in which a bottom portion of the slag door 11 is located within the slag tunnel 8 towards a position in which the bottom portion of the slag door 11 is located outside of the furnace vessel 2 and out of the slag tunnel 8. During the cleaning movement, the bottom portion of the slag door 11 is located at a selectable distance (clearance) from or in contact with the bottom **8*b* of the slag tunnel 8 for cleaning (e.g., scraping) the slag tunnel 8** after a slagging operation. This will be explained in more detail below.

Figure 3A:
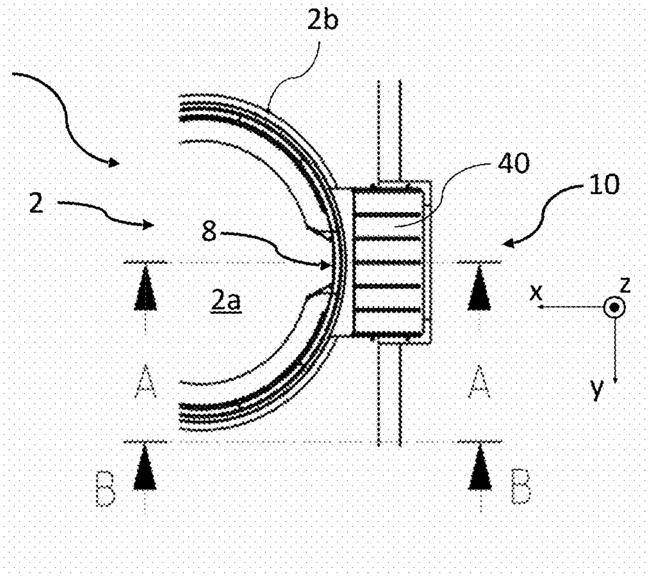
Figure 3B:
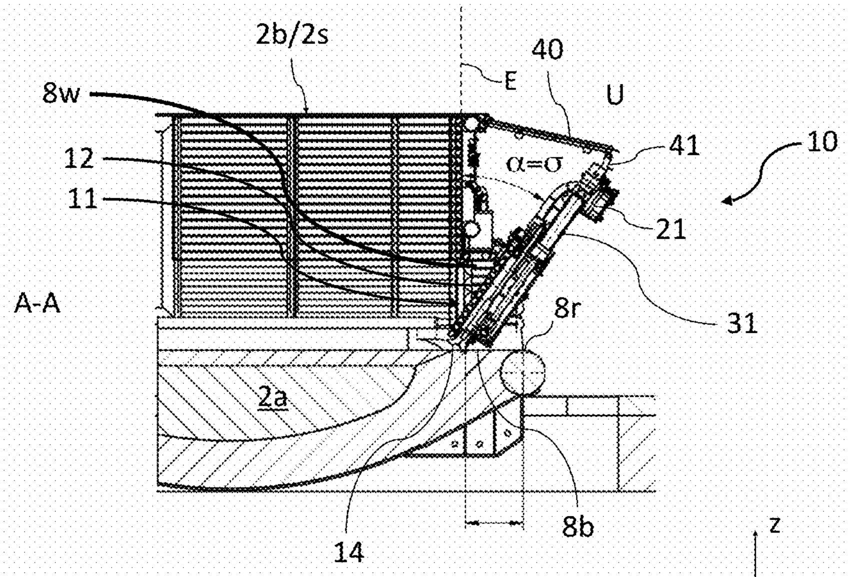
Figure 3C:
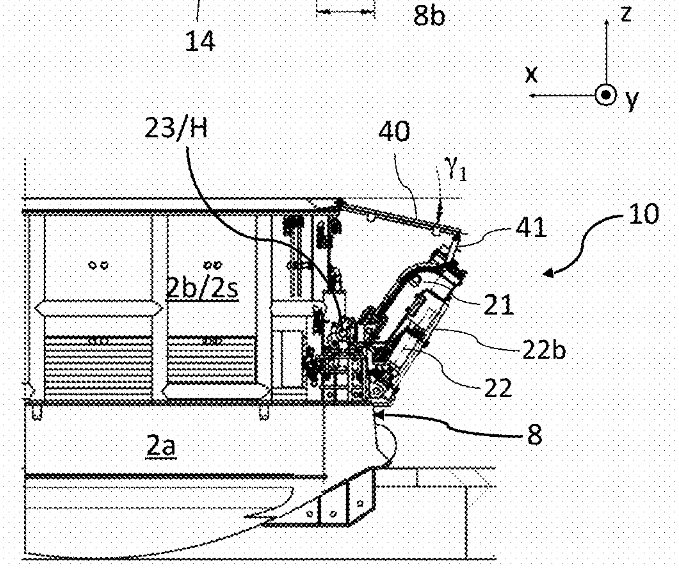

FIGS. 3A-3C shows partial views of the EAF 1 in a horizontal position (horizontal tilt position) with the first embodiment of the slag door arrangement 10, in which FIG. 3A is a plan view, FIG. 3B is a sectional view along the line A-A shown in FIG. 3A, and FIG. 3C is a lateral view along the line B-B shown in FIG. 3A. FIGS. 5A-5C show partial views of the EAF in a tilted position for deslagging tilted by the tilt angle κ with respect to the horizontal with the first embodiment of the slag door arrangement, in which FIG. 5A is a top view, FIG. 5B is a side view along line C-C shown in FIG. 5A, and FIG. 5C is a view of the slag door side along line D-D shown in FIG. 5B.

However, FIGS. 5A-5C do not show the position of the slag door 11 during slagging, but rather show the position of the slag door 11 after a deslagging and a subsequent movement of the slag door 11 to the initial position of a cleaning movement. During deslagging, the slag door 11 is in the position shown in FIG. 1 or FIG. 4C relative to the furnace vessel 2, in which the slag tunnel 8 is fully open. After deslagging, the slag door 11 is moved, for example, to a position relative to the furnace vessel 2 shown in FIGS. 3A-3C and 5A-5C. For this purpose, the pivot position of the slag door pivoting device 20 is first moved to the position shown in FIGS. 3B and 5B, but without changing the lifting position of the slag door lifter 30 relative to the position shown in FIG. 1 or FIG. 4C. Only then is the lifting position of the slag door lifter 30 moved from the position shown in FIG. 1 or FIG. 4C to the position shown in FIGS. 3B and 5B. That is, first the pivot angle is changed from the fourth pivot angle β', which may be equal to the second pivot angle β, to the third pivot angle α', which may be equal to the first pivot angle α, before the lifting position is moved from the (second) upper maximum lifting position O toward the (first) lower minimum lifting position U until contacting the bottom 8*b* of the slag tunnel 8 (or reaching a predetermined maximum resistance to further movement at a distance (clearance) from the bottom 8*b*). This prevents residual slag and other debris on the bottom 8*b* and in the slag tunnel 8 from being pushed inward along the bottom 8*b* from the outside by a movement of the slag door from the position in FIG. 4C.

The pivot position of the slag door pivoting device 20 and the lifting position of the slag door lifter 30 and thus the position of the slag door 11 relative to the furnace vessel 2 and to the slag tunnel 8 and its floor 8*b* are identical in FIGS. 3A-3C and FIGS. 5A-5C and correspond to the position in FIG. 2 and FIG. 4A. In this position, the slag door 11 protrudes in a position of the slag door pivoting device 20 pivoted about the horizontal pivot axis H by a third pivot angle α' corresponding (equal) to the first pivot angle a minus 0 to 5° and in a position of the slag door lifter 30, in which the slag door 11 is moved in the direction of the (first) lower minimum lifting position U until it contacts the bottom 8*b* of the slag tunnel 8, the slag door 11 enters the slag tunnel 8 obliquely from the outside at the top and lies (is disposed) opposite its side walls 8*s* with clearance s. From this position shown in FIG. 4A, the slag door 11 can be moved to the position shown in FIG. 4B by appropriately controlling the pivot position of the slag door pivoting device 20 and the lift position of the slag door lift 30, and in such a way that the slag gate (slag pusher) 14 is moved along the bottom 8*b* to the bottom edge 8*r*. Such movement pushes residual slag and other residue remaining on the bottom 8*b* and in the slag channel 8 after deslagging in a direction from inside the slag channel 8 near the interior of the furnace vessel 2 to outwardly of the slag channel 8, that is, in a direction opposite to the x-direction.

During the movement of the slag door 11, the applied force is measured directly using transducers and/or indirectly by evaluating parameters of the actuators. When a predetermined first limit value (threshold) of the measured force is reached, the movement of the slag door 11 towards the (first) lower minimum lifting position U is stopped. If the remaining slag and other residues in the slag channel 8 are too thick, further movement of the slag door 11 towards the bottom 8*b* would possibly damage the equipment and/or pushing out the remaining slag and other residues would not be possible at once. Therefore, the movement of the slag door 11 from the inside to the outside is then performed at an appropriate distance (clearance) from the bottom 8*b*. Thereafter, the movement sequences are repeated. It is to be expected that when the slag door 11 is moved again from the position shown in FIG. 4C to the position shown in FIG. 4A, the predetermined first limit value of the measured force is reached only closer to the floor 8*b* or upon contact with the floor 8*b*. If the floor 8*b* is not reached (contacted) after one or two repetitions, or if a predetermined second limit value (threshold) of the measured force is reached during the movement, the operation is aborted by the control system and a corresponding message is issued. In this case, operating personnel must check whether the residues must be removed differently or whether there is another malfunction.

In the first embodiment, the amount of the pivot angle range σ is therefore equal to that of the first pivot angle α. The design can be modified so that the second pivot angle β spans from the vertical plane E through the horizontal pivot axis H in the direction away from the furnace vessel 2 (e.g., such that the first side or ray of the second pivot angle β is the vertical plane E and the second side or ray of the second pivot angle β extends from a vertex in the vertical plane E that is on a (the) crossing line of the vertical plane E and a plane that is parallel to the horizontal axis H and parallel to the movement path of the slag door 11 in an most outwardly inclined pivot position of the slag door 11 (the position in which the upper end of the slag door 11 has the smallest distance from the side wall 2*s* of the furnace top vessel 2*b*) between the (first) lower minimum lifting position U and a (second) upper maximum lifting position O (in FIG. 7F shown below the horizontal pivot axis H and in FIG. 7E shown above and below the horizontal pivot axis H) such that the second side or ray of the second pivot angle β extends downwardly from the vertex (i.e. the horizontal pivot axis H) in a direction away from the furnace vessel 2), so that the amount of the pivot angle range σ is therefore equal to the sum of the amounts of the first pivot angle α and the (non-zero) second pivot angle β (see FIG. 7F). In other words, as can be seen in FIGS. 7A, 7B, 7D and 7E, at the first pivot angle α, the lower portion of the slag door 11 (in particular, the slag pusher 14) is closer to the furnace vessel 2 than the upper portion of the slag door 11. Furthermore, as can be seen in FIGS. 7C and 7E, at the second pivot angle α, the lower portion of the slag door 11 (in particular, the slag pusher 14) is farther away from the furnace vessel 2 than the upper portion of the slag door 11. It is also possible to construct a modified embodiment (not shown) in which the second pivot angle β spans from the vertical plane E through the horizontal pivot axis H also in the direction towards the furnace vessel 2, so that the amount of the pivot angle range σ is equal to the difference of the amounts of the first pivot angle α and the second pivot angle β.

In the first embodiment, the slag door 11 has a plate-shaped design because this makes it relatively easy to achieve a good seal of the slag tunnel 8. In principle, the slag door 11 could also have a curved or other structure whose outer contour (perimeter) is then adapted (conformed, matched) to the cross-sectional shape of the slag tunnel 8 for sealing the same in the closed position of the slag door 11.

Figure 6A:
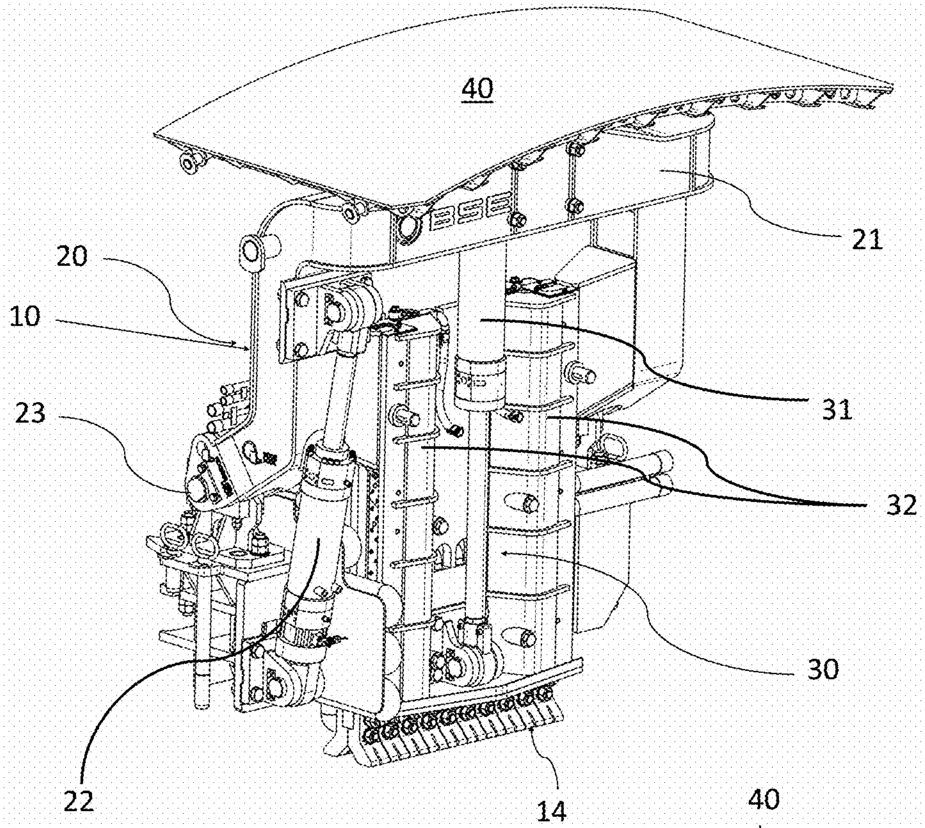
Figure 6B:
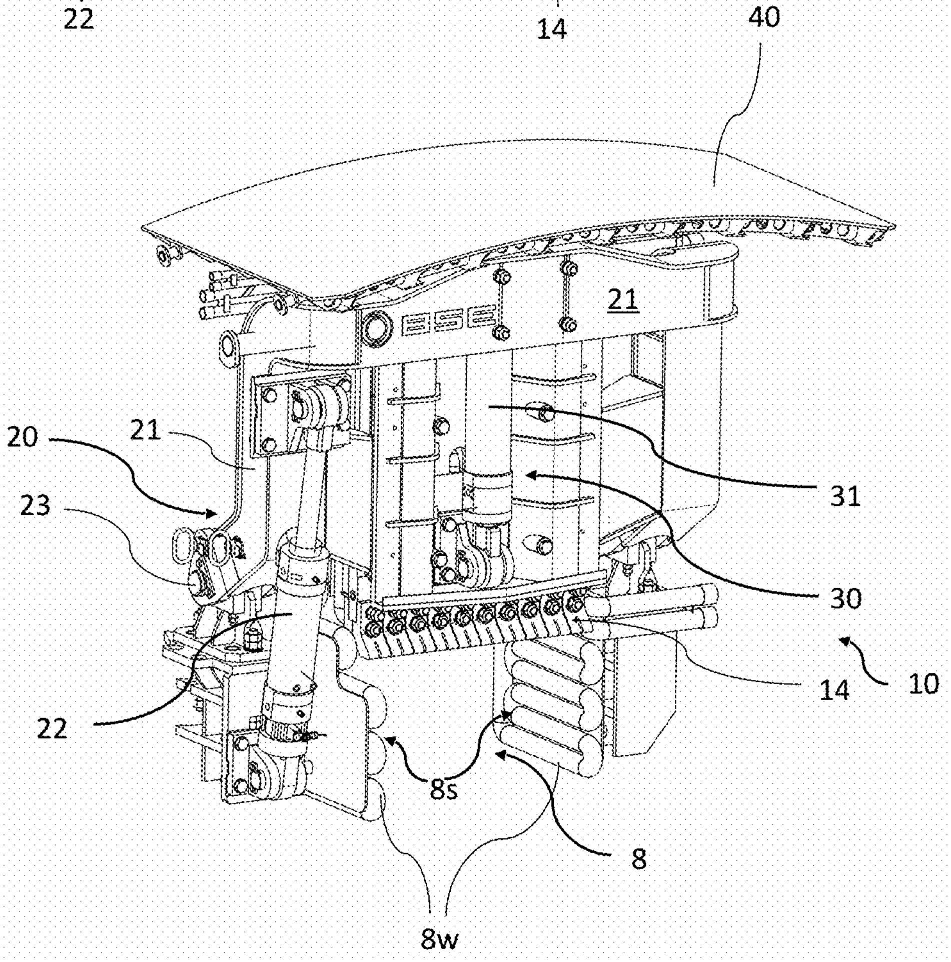

FIGS. 6A and 6B show a second embodiment of a slag door arrangement in a side perspective view from the front left outside an EAF, in which FIG. 6A shows the slag door closed and FIG. 6B shows the slag door open. The second embodiment corresponds to the first embodiment except for the differences described below, and the description of the corresponding features in the first and second embodiments is not repeated.

In the second embodiment of a slag door arrangement 10, the cover 40 is also plate-shaped but is slightly curved rather than flat. The cover 40 is also not pivoted relative to the horizontal in the positions shown in FIGS. 6A and 6B, which correspond to the positions shown in FIGS. 4B and 4C. Its position is not changed, unlike in the first embodiment. In the slag door arrangement 10 shown in FIGS. 6A and 6B, the linear guide 32 is clearly visible. In the slag door arrangement 10 in FIG. 6, the hydraulic cylinder 22 can also be seen well because the cover 22*b* is not provided.

FIGS. 7A-7F show partial views of an EAF with a third embodiment of a slag door arrangement 10 in six sectional views along a line corresponding to line A-A of FIG. 3A. More specifically, FIGS. 7A-7F respectively show different positions in a sequence of movements of the slag door 11 for cleaning the slag tunnel 8. The third embodiment corresponds to the first embodiment except for the differences described below, and the description of the corresponding features in the first, second and third embodiments is not repeated.

In the third embodiment of a slag door arrangement 10, the cover 40 is also plate-shaped, but is fixedly attached to the upper edge of the furnace vessel 2 rather than being movable. Its position does not change, unlike in the first embodiment. In the third embodiment, the pivoting range is different from the first and second embodiments. In the third embodiment, the second pivot angle β spans from the vertical plane E through the horizontal pivot axis H in the direction away from the furnace vessel 2, so that the amount of the pivot angle range σ is equal to the sum of the amounts of the first pivot angle α and the second pivot angle β.

FIGS. 7A-7F show a two-stage cleaning process. First, the pivot position of the slag door pivoting device 20 is brought into the position shown in FIG. 7A, in which the pivot position is pivoted about the horizontal pivot axis H by a third pivot angle α' corresponding (equal) to the first pivot angle α minus 0 to 5°, and the lifting position of the slag door lifter 30 is in the (second) upper maximum lifting position O.

Thereafter, the lifting position of the slag door lifter 30 is moved from the position shown in FIG. 7A toward the (first) lower minimum lifting position U until either a predetermined distance (clearance) from the bottom 8*b* is reached or the predetermined first limit value of the measured force is reached (FIG. 7B).

Then, a pivoting movement about the pivot axis H is performed without changing the lifting position. As a result, the lower edge of the slag door 11 with the slag pusher 14 is not moved parallel to the bottom 8*b* at a certain distance but in a movement on a circular section (arc) with a minimum distance (clearance) from the bottom 8*b* at the greatest (closest) approach until the fourth pivot angle β', which may be equal to the second pivot angle β, is reached (FIG. 7C).

Then these movements are repeated in FIGS. 7D-7F. First, if necessary, with the lifting position unchanged or with the lifting position changed in the direction of the (second) upper maximum lifting position O, a pivoting movement is performed back to the pivot position with (at) the third pivot angle α', which corresponds to the first pivot angle α minus 0 to 5°. Thereafter, the lifting position of the slag door lifter 30 is moved in the direction of the (first) lower minimum lifting position U until either a reduced (smaller) predetermined distance (clearance) from the bottom 8*b* is reached or the predetermined first limit value of the measured force is reached (FIG. 7D).

Then, a pivoting movement about the pivot axis H is performed without changing the lifting position. As a result, the lower edge of the slag door 11 with the slag pusher 14 is not moved parallel to the bottom 8*b* at a certain distance but in a movement on a circular section (arc) with a minimum distance (clearance) from the bottom 8*b* at the greatest (closest) approach until the fourth pivot angle β', which can be equal to the second pivot angle β, is reached (FIG. 7E). The minimum distance (clearance) from the bottom 8*b* can also be set to zero.

Afterwards, the lifting position can be changed again in the direction of the (second) upper maximum lifting position O, and, for example, a visual inspection of the slag tunnel 8 can be carried out by camera or by eye.

In the slag door arrangement 10 of any of the above-described embodiments, the angular range σ between the first pivot angle α and the second pivot angle β (i.e. the total or summation of the first pivot angle α and the second pivot angle β) is between 25° and 60°, preferably 25° or 30° or 35° or 40° or 41° or 45° or 50° or 55° or 60°. The first pivot angle α is in the range of 25° to 45°, preferably 25° to 35°, preferably 26° to 35° relative to the plane E through the horizontal pivot axis H and is preferably 25° or 26° or 35°. The second pivot angle β is in the range of 0° to 25°, preferably 0° to 20°, preferably 0° to 15° relative to the plane E through the horizontal pivot axis H and is preferably 0° or 5° or 10° or 15°.

All described cleaning movements can be implemented with all embodiments, since the pivoting and linear movements are independent of each other and can be controlled.

The variations and modifications described for the embodiments are in each case also applicable to all other embodiments.

The slag door arrangement is suitable (adapted) for use in metallurgical furnaces, especially EAFs having tapping masses from 50 to 200 tons.

It is explicitly emphasized that all features disclosed in the description and/or claims are to be considered separate and independent from each other for the purpose of the original disclosure as well as for the purpose of limiting the claimed invention regardless of the combinations of features in the embodiments and/or claims. It is explicitly stated that all range indications or indications of groups of units disclose any possible intermediate value or subgroup of units for the purpose of the original disclosure as well as for the purpose of limiting the claimed invention, in particular also as a limit of a range indication.

REFERENCE SIGNS

1 metallurgical furnace, 1*e* electrode, 2 furnace vessel, 2*a* furnace bottom vessel, 2*b* furnace top vessel, 2*c* furnace lid, 2*s* side wall, 3 furnace cradle, 4 hydraulic cylinder, 5 foundation, 6 floor, 7 slag door, 8 slag tunnel, 8*s* side walls, 8*b* bottom, 8*r* bottom rim, 8*or* upper outer edge, 10 slag door assembly, 11 plate-shaped slag door, 12 water-cooled panel, 14 slag pusher, 20 slag door pivoting device (slag door pivoter), 21 rocker arm, 22 hydraulic cylinder, 23 pivot axis, 30 slag door lifter, 31 hydraulic lift cylinder, 32 linear guide, 40 protective cover, 41 bar, 50 control device, 60 gantry, 61 electrode support arm, 71 exhaust manifold, S slag door side, A tapping side, K exhaust manifold side, P portal side, s clearance, H horizontal pivot axis, U (first) lower minimum lifting position, O (second) upper maximum lifting position, E vertical plane, σ pivot angle range, α first pivot angle, β second pivot angle, α' third pivot angle, β' fourth pivot angle, $\gamma_1$ fifth pivot angle, $\gamma_2$ sixth pivot angle, κ tilt angle

I claim:

1. A slag door assembly for a metallurgical furnace that includes a furnace vessel having a slag tunnel with a rectangular opening cross-section extending laterally through the furnace vessel, the slag door assembly comprising:

a slag door having a width corresponding to a width of the rectangular opening cross-section of the slag tunnel with a first predetermined clearance between the slag door and side walls of the slag tunnel so that the slag door is movable within the slag tunnel, a slag door pivoting device configured to be pivoted about a horizontal pivot axis, and a slag door lifter on which the slag door is mounted, the slag door lifter being configured to move the slag door between a lower minimum lifting position and an upper maximum lifting position that is perpendicular to the horizontal pivot axis, wherein:

the slag door pivoting device is pivotable about the horizontal pivot axis through a range of pivot angles between a first pivot angle that spans from a vertical plane through the horizontal pivot axis toward the furnace vessel and a second pivot angle which is in the vertical plane or spans from the vertical plane through the horizontal pivot axis in a direction away from the furnace vessel, the slag door lifter is mounted on the slag door pivoting device and is configured such that a pivoting movement of the slag door about the horizontal pivot axis and a lifting movement of the slag door in the direction perpendicular to the horizontal pivot axis are independent of each other, the slag door is plate shaped and extends in a slag door plane, a first ray of the first and second pivot angles extends in the vertical plane, a second ray of the first and second pivot angles extends from the horizontal pivot axis parallel to the slag door plane, and the second ray extends downwardly from the horizontal pivot axis.

2. The slag door assembly according to claim 1, further comprising a water-cooled panel attached to the slag door on the side facing an interior space of the furnace vessel.

3. The slag door assembly according to claim 1, further comprising a slag pusher attached to an underside of the slag door that faces away from the horizontal pivot axis.

4. The slag door assembly according to claim 1, wherein the slag door pivoting device comprises:

a rocker configured to be laterally supported on the furnace vessel on both sides of the slag tunnel so as to be pivotable about the horizontal pivot axis, and a hydraulic cylinder having a first end connected to the rocker and a second end configured to be supported on the furnace vessel.

5. The slag door assembly according to claim 1, wherein the slag door lifter includes:

a hydraulic lifting cylinder having a first end connected to the slag door and a second end connected to the slag door pivoting device, and a linear guide mounted on the slag door pivoting device, the slag door being displaceably mounted on the linear guide.

6. The slag door assembly according to claim 1, further comprising:

a protective cover provided in the vertical direction above the slag door, the slag door pivoting device and the slag door lifter, wherein the protective cover has outer dimensions that cover the slag door, the slag door pivoting device and the slag door lifter in a vertical plan view thereof in all pivot positions of the slag door pivoting device and all lifting positions of the slag door lifter.

7. The slag door assembly according to claim 1, wherein:

an angular range between the first pivot angle and the second pivot angle is between 25° and 60°, the first pivot angle is in the range of 25° to 45° relative to the plane through the horizontal pivot axis, and the second pivot angle is in the range of 0° to 25° relative to the plane through the horizontal pivot axis.

8. The slag door assembly according to claim 1, further comprising:

a control device connected to the slag door pivoting device and the slag door lifter and configured to input and store parameters for controlling pivot positions of the slag door pivoting device and lifting positions of the slag door lifter, wherein the control device is further configured to:

measure, during movement of the slag door, an applied force directly using transducers and/or indirectly by evaluating parameters of the actuators, in response to a determination that a predetermined first limit value of the measured applied force has been reached, stop the movement of the slag door towards the lower minimum lifting position, and in response to a determination that a predetermined second limit value of the measured applied force has been reached during movement of the slag door, abort the movement and issue a corresponding message.

9. An electric arc furnace, comprising:

a furnace vessel having a side wall and a slag tunnel extending laterally through the side wall of the furnace vessel, the slag tunnel having a rectangular opening cross section and side walls, an upper outer rim and a bottom, a furnace tilting device comprising a cradle on which the furnace vessel is supported, the furnace tilting device being configured to tilt the furnace vessel relative to a horizontal of a foundation on which the electric arc furnace stands, and a slag door assembly comprising:

a slag door having a width that corresponds to a width of the rectangular opening cross-section of the slag tunnel with a first predetermined clearance between the slag door and the side walls of the slag tunnel so that the slag door is movable within the slag tunnel, a slag door pivoting device configured to be pivoted about a horizontal pivot axis, and a slag door lifter on which the slag door is mounted, the slag door lifter being configured to move the slag door between a lower minimum lifting position and an upper maximum lifting position perpendicular to the horizontal pivot axis, wherein:

the slag door pivoting device is pivotable about the horizontal pivot axis through a range of pivot angles between a first pivot angle that spans from a vertical plane through the horizontal pivot axis toward the furnace vessel and a second pivot angle which is in the vertical plane or spans from the vertical plane through the horizontal pivot axis in a direction away from the furnace vessel, and the slag door lifter is mounted on the slag door pivoting device in a manner that a pivoting movement of the slag door about the horizontal pivot axis and a lifting movement of the slag door in the direction perpendicular to the horizontal pivot axis are independent of each other, the slag door assembly is attached to the furnace vessel and configured such that, in a horizontal tilt position of the furnace vessel, the vertical plane through the horizontal pivot axis is perpendicular to the horizontal, the horizontal pivot axis lies outside the furnace vessel, the slag door, in a position of the slag door pivoting device pivoted about the horizontal pivot axis by a third pivot angle corresponding to the first pivot angle minus 0 to 5°, and in a position of the slag door lifter, in which the slag door is moved in the direction of the lower minimum lifting position until the slag door contacts the bottom of the slag tunnel, projects obliquely into the slag tunnel from the outside at the top and faces the side walls of the slag tunnel with the first predetermined clearance therebetween;

the slag door is plate shaped and extends in a slag door plane;

the slag door pivoting device is configured to pivot the slag door between the first pivot angle and the second pivot angle, a first ray of the first and second pivot angles extends in the vertical plane, and a second ray of the first and second pivot angles extends from the horizontal pivot axis parallel to the slag door plane.

10. The electric arc furnace of claim 9, wherein:

the bottom of the slag tunnel, in a plan view, is extended laterally beyond the side walls of the furnace vessel to a bottom edge, and the slag door touches the bottom at the bottom edge in a position of the slag door pivoting device pivoted about the horizontal pivot axis by a fourth pivot angle corresponding to the second pivot angle minus 0 to 5°, and in a position of the slag door lifter, in which the slag door is moved in the direction of the lower minimum lifting position until the slag door touches the bottom of the slag tunnel.

11. The electric arc furnace of claim 9, wherein:

the slag door assembly comprises a control device connected to the slag door pivoting device and to the slag door lifter and configured to input and store parameters for controlling the pivot positions of the slag door pivoting device and lifting positions of the slag door lifter, and the control device is configured to:

measure, during movement of the slag door, an applied force directly using transducers and/or indirectly by evaluating parameters of the actuators, in response to a determination that a predetermined first limit value of the measured applied force has been reached, stop the movement of the slag door towards the lower minimum lifting position, and in response to a determination that a predetermined second limit value of the measured applied force has been reached during movement of the slag door, abort the movement and issue a corresponding message.

12. The electric arc furnace of claim 11, wherein:

the control device is configured to control the pivot positions of the slag door pivoting device and the lift positions of the slag door lift such that, in an operation to clean the slag tunnel, the slag door undergoes a cleaning movement from a position in the slag tunnel towards the outside of the furnace out of the slag tunnel either parallel to the bottom of the slag tunnel at a second predetermined clearance from the bottom of the slag tunnel or in contact with the bottom of the slag tunnel or in a movement on a circular section with a minimum clearance between the slag door and the bottom of the slag tunnel at a point of closest approach to the bottom of the slag tunnel, and the second predetermined clearance or the minimum clearance are settable to zero.

13. A method for cleaning a slag opening of an electric arc furnace comprising a furnace vessel having a side wall, a slag tunnel extending laterally through the side wall of the furnace vessel, the slag tunnel having a rectangular opening cross-section and side walls, an upper outer edge and a bottom, and a slag door assembly comprising:

a slag door having a width that corresponds to a width of the rectangular opening cross-section of the slag tunnel with a first predetermined clearance between the slag door and the side walls of the slag tunnel so that the slag door is movable within the slag tunnel, a slag door pivoting device configured to be pivoted about a horizontal pivot axis, and a slag door lifter on which the slag door is mounted, the slag door lifter being configured to move the slag door between a lower minimum lifting position and an upper maximum lifting position perpendicular to the horizontal pivot axis, wherein:

the slag door pivoting device is pivotable about the horizontal pivot axis through a range of pivot angles between a first pivot angle that spans from a vertical plane through the horizontal pivot axis toward the furnace vessel and a second pivot angle which is in the vertical plane or spans from the vertical plane through the horizontal pivot axis in a direction away from the furnace vessel, and the slag door lifter is mounted on the slag door pivoting device in a manner that a pivoting movement of the slag door about the horizontal pivot axis and a lifting movement of the slag door in the direction perpendicular to the horizontal pivot axis are independent of each other, and the horizontal pivot axis lies outside the furnace vessel, the method comprising:

a) after a deslagging operation in which the slag door is moved by the slag door lifter to or close to the upper maximum lifting position, moving the slag door pivoting device to a position pivoted about the horizontal pivot axis by a third pivot angle corresponding to the first pivot angle minus 0 to 5°;

b) moving the slag door using the slag door lifter in the direction of the lower minimum lifting position to a second predetermined clearance between the slag door and the bottom of the slag tunnel so that the slag door projects obliquely into the slag tunnel from the outside at the top and faces its side walls across the first predetermined clearance;

c) moving the slag door lifter about the horizontal pivot axis in the direction of the second pivot angle to a fourth pivot angle corresponding to the second pivot angle minus 0 to 5°, either while simultaneously moving the slag door using the slag door lifter to maintain at least the second predetermined clearance from the bottom of the slag tunnel so that the slag door is moved parallel to and along the bottom at least at the second predetermined clearance, or in a movement on a circular section with a minimum clearance between the slag door and the bottom of the slag tunnel at a point of closest approach to the bottom of the slag tunnel; and d) moving the slag door pivoting device about the horizontal pivot axis in the direction of the first pivot angle to a position pivoted by a third pivot angle corresponding to the first pivot angle minus 0 to 5° with the slag door moved toward the upper maximum lift position such that the slag door is thereby moved a distance from the bottom of the slag tunnel greater than the second predetermined clearance or the minimum clearance; and e) moving the slag door using the slag door lifter in the direction of the lower minimum lifting position until it contacts the bottom of the slag tunnel, so that the slag door projects obliquely into the slag tunnel from the outside at the top and faces its side walls across the first predetermined clearance.

14. The method according to claim 13, wherein steps a) to c) are repeated before carrying out steps d) and e) at a third predetermined clearance from the bottom of the slag tunnel that is less than the second predetermined clearance or with a reduced minimum clearance compared to the minimum clearance from the bottom of the slag tunnel.

15. Method according to claim 14, where the third predetermined clearance or the reduced predetermined clearance is set to zero.

16. The method according to claim 13, wherein:

a force applied to move the slag door in steps a) to e) is measured, and in step b), in response to a determination that a predetermined first limit value of the measured force has been reached, the movement of the slag door towards the first lower minimum lifting position is stopped and the actual clearance from the bottom of the slag tunnel is used as the second predetermined clearance or the minimum clearance for the following step c), and in steps a) to e), execution of the method is interrupted in response to a determination that a second limit value of the measured applied force, which is individually predetermined for each of the steps, has been reached.

17. The slag door assembly according to claim 4, further comprising:

a control device connected to the slag door pivoting device and the slag door lifter and configured to input and store parameters for controlling pivot positions of the slag door pivoting device and lifting positions of the slag door lifter, wherein the control device is further configured to:

measure, during movement of the slag door, an applied force directly using transducers and/or indirectly by evaluating parameters of the actuators, in response to a determination that a predetermined first limit value of the measured applied force has been reached, stop the movement of the slag door towards the lower minimum lifting position, and in response to a determination that a predetermined second limit value of the measured applied force has been reached during movement of the slag door, abort the movement and issue a corresponding message.

18. The slag door assembly according to claim 5, further comprising:

a control device connected to the slag door pivoting device and the slag door lifter and configured to input and store parameters for controlling pivot positions of the slag door pivoting device and lifting positions of the slag door lifter, wherein the control device is further configured to:

measure, during movement of the slag door, an applied force directly using transducers and/or indirectly by evaluating parameters of the actuators, in response to a determination that a predetermined first limit value of the measured applied force has been reached, stop the movement of the slag door towards the lower minimum lifting position, and in response to a determination that a predetermined second limit value of the measured applied force has been reached during movement of the slag door, abort the movement and issue a corresponding message.

19. A slag door assembly for a metallurgical furnace that includes a furnace vessel having a slag tunnel with a rectangular opening cross-section extending laterally through the furnace vessel, the slag door assembly comprising:

a slag door having a width corresponding to a width of the rectangular opening cross-section of the slag tunnel with a first predetermined clearance between the slag door and side walls of the slag tunnel so that the slag door is movable within the slag tunnel, a slag door pivoting device configured to be pivoted about a horizontal pivot axis, a slag door lifter on which the slag door is mounted, the slag door lifter being configured to move the slag door between a lower minimum lifting position and an upper maximum lifting position that is perpendicular to the horizontal pivot axis, and a control device connected to the slag door pivoting device and the slag door lifter and configured to input and store parameters for controlling pivot positions of the slag door pivoting device and lifting positions of the slag door lifter, wherein:

the slag door pivoting device is pivotable about the horizontal pivot axis through a range of pivot angles between a first pivot angle that spans from a vertical plane through the horizontal pivot axis toward the furnace vessel and a second pivot angle which is in the vertical plane or spans from the vertical plane through the horizontal pivot axis in a direction away from the furnace vessel, the slag door lifter is mounted on the slag door pivoting device and is configured such that a pivoting movement of the slag door about the horizontal pivot axis and a lifting movement of the slag door in the direction perpendicular to the horizontal pivot axis are independent of each other, and the control device is further configured to:

measure, during movement of the slag door, an applied force directly using transducers and/or indirectly by evaluating parameters of the actuators, in response to a determination that a predetermined first limit value of the measured applied force has been reached, stop the movement of the slag door towards the lower minimum lifting position, and in response to a determination that a predetermined second limit value of the measured applied force has been reached during movement of the slag door, abort the movement and issue a corresponding message.

* * * * *